United States Patent
Towler et al.

(10) Patent No.: US 7,259,818 B2
(45) Date of Patent: Aug. 21, 2007

(54) NEMATIC LIQUID CRYSTAL DEVICES COMPRISING SURFACE PROTRUSIONS FORMED OF ANISOTROPIC MATERIAL FOR NUCLEATION OF AN ACTIVE REGION

(75) Inventors: Michael John Towler, Oxford (GB); Elizabeth Jane Acosta, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/087,660

(22) Filed: Mar. 1, 2002

(65) Prior Publication Data
US 2002/0126245 A1 Sep. 12, 2002

(30) Foreign Application Priority Data
Mar. 6, 2001 (GB) .................. 0105434.5

(51) Int. Cl.
G02F 1/1337 (2006.01)
(52) U.S. Cl. .................. 349/123; 349/191; 349/179
(58) Field of Classification Search ................ 349/123, 349/125, 191, 94, 126, 130, 179, 187, 177, 349/186
See application file for complete search history.

(56) References Cited

U.S. PATENT DOCUMENTS

| | | | |
|---|---|---|---|
| 4,232,947 A * | 11/1980 | Funada et al. ............. 350/341 |
| 5,959,707 A | 9/1999 | Murai et al. |
| 6,249,332 B1 * | 6/2001 | Bryan-Brown et al. ..... 349/129 |
| 6,295,111 B1 | 9/2001 | Kim et al. |
| 6,618,113 B1 * | 9/2003 | Ulrich et al. ............ 349/156 |
| 6,879,364 B1 * | 4/2005 | Sasaki et al. ............. 349/129 |
| 6,897,918 B1 * | 5/2005 | Nonaka et al. ............ 349/106 |

FOREIGN PATENT DOCUMENTS

| | | |
|---|---|---|
| EP | 1 020 756 A1 | 9/1998 |
| EP | 0 880 052 A2 | 11/1998 |
| EP | 0 965 876 A2 | 6/1999 |
| EP | 0 880 052 A3 | 12/1999 |
| EP | 0 996 028 A2 | 4/2000 |
| EP | 1 070 981 | 1/2001 |
| EP | 1 124 153 A2 | 8/2001 |
| EP | 1 139 151 | 10/2001 |
| EP | 1 124 153 A3 | 4/2003 |
| JP | 07-120764 | 5/1995 |
| JP | 10-268318 | 10/1998 |

(Continued)

OTHER PUBLICATIONS

EP 0996028 A2, Acosta et al., Apr. 26, 2000.*

(Continued)

Primary Examiner—Thoi V. Duong
(74) Attorney, Agent, or Firm—Renner, Otto, Boisselle & Sklar, LLP

(57) ABSTRACT

A liquid crystal device comprises a nematic liquid crystal, voltage means for applying a voltage across said liquid crystal, and two substrates (42, 30) each provided with an alignment layer (32, 33), wherein: said liquid crystal is sandwiched between said two substrates (42, 30); said nematic liquid crystal can be placed in at least one operating state and at least one non-operating state, and at least one of said alignment layers (32, 33) is provided with a plurality of surface protrusions (40) formed from an anisotropic material.

22 Claims, 9 Drawing Sheets

FOREIGN PATENT DOCUMENTS

| | | |
|---|---|---|
| JP | 10-325955 | 12/1998 |
| KR | 10-0236256 | 12/1999 |
| WO | 98/04953 | 5/1998 |
| WO | 01/23951 A1 | 5/2001 |
| WO | 01/37036 A1 | 5/2001 |

OTHER PUBLICATIONS

British Search Report, Application No. GB 0105434.5, dated Nov. 13, 2001.

Taiwan Office Action dated Nov. 25, 2003.

European Search Report for corresponding Application 02256872.9, dated Jul. 6, 2004.

Bos, P.J. et al., "The pi-Cell: A Fast Liquid-Crystal Optical-Switching Device", Molecular Crystals and Liquid Crystals (Inc. Nonlinear Optics), Gordon and Breach Science Publishers, Reading GB, vol. 113, No. 1-4, 1984, pp. 329-339, XP002053315.

European Search Report regarding Application No. 02250944.2 dated Sep. 18, 2003.

Korean Office Action for corresponding Application US 5,959,707, dated Feb. 24, 2004.

\* cited by examiner

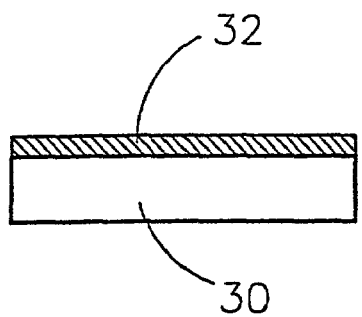
FIG_3a
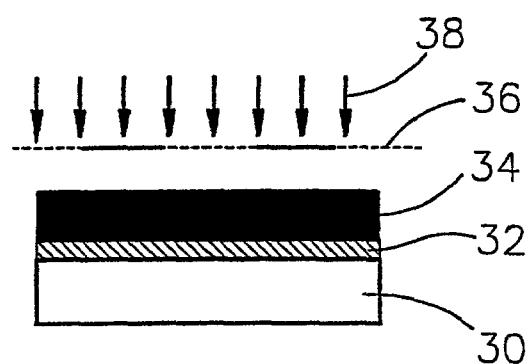
FIG_3b
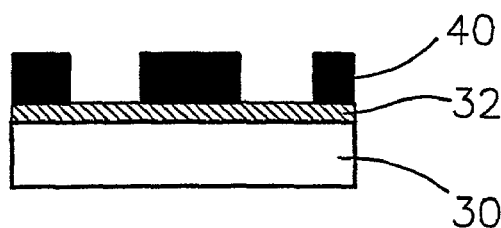
FIG_3c
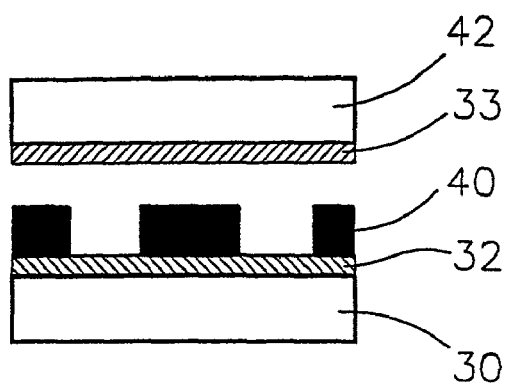
FIG_3d

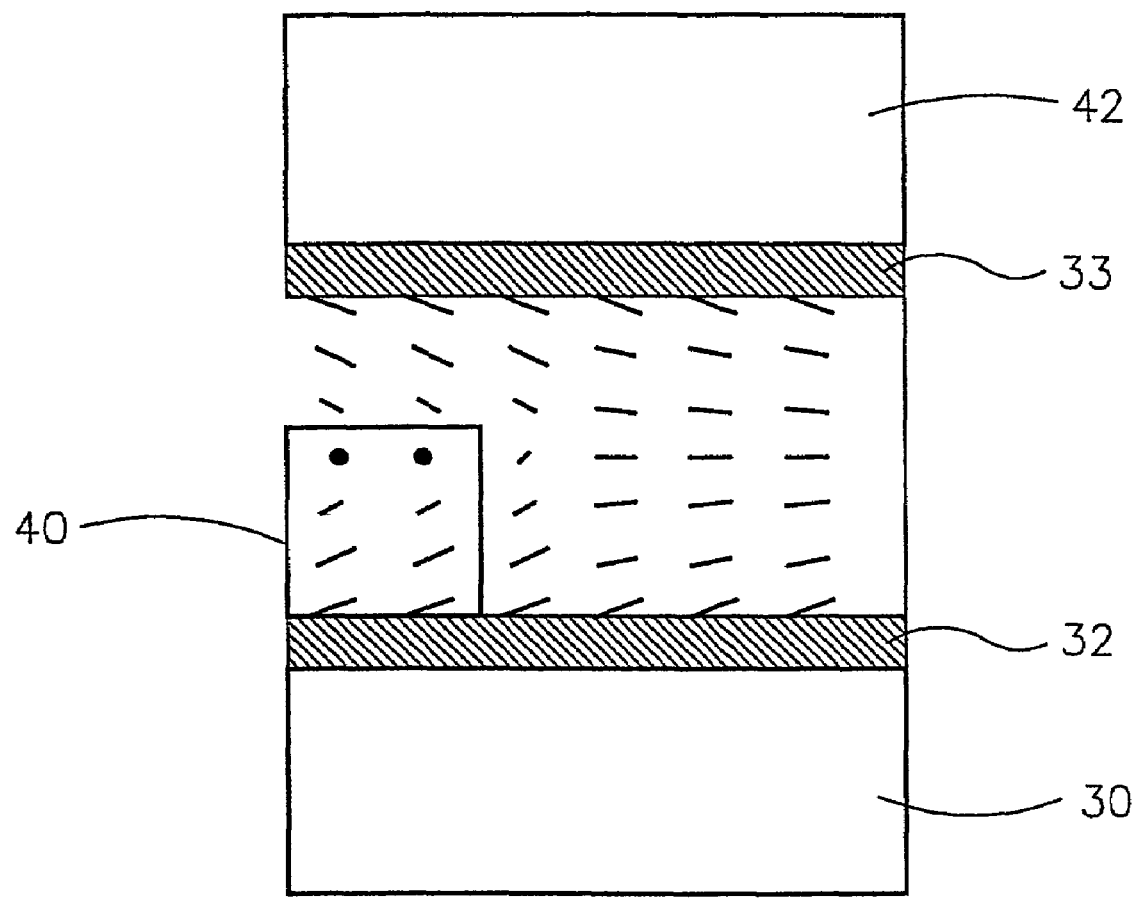
FIG 4ᵃ

NEMATIC LIQUID CRYSTAL DEVICES COMPRISING SURFACE PROTRUSIONS FORMED OF ANISOTROPIC MATERIAL FOR NUCLEATION OF AN ACTIVE REGION

BACKGROUND OF THE INVENTION

1. Field of the Invention

The invention relates to nematic liquid crystal devices formed with anisotropic protrusions, and methods of production. thereof.

2. Description of the Related Art

The invention can be used to provide an improvement in obtaining and if necessary isolating the operating state of a pi-cell liquid crystal device at low voltages. The invention can also be applied to nucleating the operating states from the globally stable states in the BTN device, and for isolating the operating states from each other and from the globally stable state.

The invention is particularly applicable to flat panel displays and pi-cells used in LCTV. Another application is in using BTN displays in mobile products.

P. D. Berezin, L. M. Blinov, I. N. Kompanets and V. V. Nikitin 'Electro-optic Switching in Oriented Liquid-Crystal Films' July-August 1973 *Sov. J. Quant. Electron* Vol. 3, pp. 78-79 is a paper which describes the achievement of fast nematic liquid crystal response times obtained in low surface tilt, non-twisted cells. It is unclear from the paper whether the alignment directions at the two surfaces are parallel or anti-parallel. The fast switching times were achieved by applying a bias voltage such that the optical modulation is mostly caused by reorientation of the liquid crystal molecules near the surface region, whilst those in the bulk remained substantially homeotropic. (See for example lines 11-19, column 1, page 79, together with lines 14-17, column 2, page 78)

P. J. Bos and K. R. Koehler/Beran 'The pi-Cell: A Fast Liquid Crystal Optical Switching Device' 1984 *Mol. Cryst. Liq. Cryst.* Vol. 113, pp. 329-339 is a paper which introduces the pi-cell as a liquid crystal display mode that is fundamentally fast, since the symmetry of the device eliminates the adverse effects of a flow induced "backwards" torque exerted on the liquid crystal director towards the cell centre. The pi-cell has parallel surface tilt (the term "parallel" here referring to the rubbing directions at the two cell surfaces, rather than to the directors) such that at low voltages the splay (or H-) state is stable (see FIG. 3*b*, page 332). At higher voltages switching takes place between a high and low voltage bend (or V-) state (see FIG. 2*b*, page 331).

U.S. Pat. No. 4,566,756 describes a pi-cell doped for d/p>0.25. As a result of the doping this device does not form the H-state at low voltages and remains in the T-state, not the V-state at high voltages. However at high voltages the T-state has similar optical properties to that of the V-state. This mode then overcomes the nucleation problems of the conventional pi-cell and demonstrates similar optical characteristics at high voltages. Unfortunately at lower voltages the effect of the inherent twist on the optical characteristic gives a poorer performance than the conventional pi-cell.

EP 0,996,028 describes the generic use of nucleation regions to initiate the growth of the V-state from the H-state. Particular examples are given of the pi-cell device and the complementary negative pi-cell or SBD. As well as teaching patterned surface pre-tilt to generate these nucleation regions, it also teaches in-situ polymerisation of a nucleation region e.g. in the inter-pixel gaps. One technique described for patterning surface tilt is to use patterned reactive mesogen layers. These are however thin and do not protrude considerably into the liquid crystal.

EP 0,965,876A2 describes the use of substantially homeotropic alignment to surround the active pixel area within a conventionally low surface pretilt pi-cell based display. At zero volts the surrounding substantially homeotropic alignment isolates the pixel from the reformation of the H-state, at zero volts then the pixel relaxes into the twist state (T-state) (see abstract column 2, page 3, lines 39-44 and claim 1). The device is operated at higher voltages in the V-state.

Japanese Patent Application JP-A-9 90432 (Toshiba) discloses the provision of nucleation sites within a pi-cell panel. The nucleation sites are provided by including spacer balls or pillars within the pi-cell panel and cooling the liquid crystal material from an isotropic phase to a nematic phase while an electric field is applied across the panel. This results in some of the spacer balls or pillars acting as nucleation sites for growth of the V-state. However the positioning of the spacers cannot be easily controlled.

Japanese Patent Application JP-A-9 218411 (Sekisui) discloses a LCD having a bend alignment state, which is stabilised, in the absence of an applied field, by the presence of spacers in the form of spherical particles The spacers have a surface energy such that liquid crystal molecules adjacent the alignment layers are mainly aligned parallel to the alignment layers. However, in order for this technique to work, a field has to be applied during the initial alignment of the device. Also, the particles can not be positioned so as to be outside the pixel apertures so that the contrast ratio of the display is reduced by the presence of the particles.

European Patent Application No. 00310110.2 describes the use of birefringent spacers (for example those made from polymerisable reactive mesogens) in a liquid crystal display, said spacers having the same optical characteristic as one of the states of the switched states of the liquid crystal display.

DE 2,849,402A1 describes a display with both variable and invariable parts. The variable parts are liquid crystal, whilst the invariable parts are fabricated from a birefringent material running between the top and bottom surfaces. These invariable parts act also as spacers.

British Patent Application No. 9704623.9 describes a liquid crystal device in which at least one alignment layer has been fabricated from a mixture of mono-functional and di-functional reactive mesogens, the ratio of these materials acting to control the surface pre-tilt of the contiguous liquid crystal material. It teaches that as the percentage of monofunctional reactive mesogen is increased then the tilt at the RM/air interface is increased.

U.S. Pat. No. 5,995,184 describes the fabrication of thin film retardation plates from polymerisable reactive mesogens. It teaches the addition of an additive that migrates to the RM/air interface to modify the surface energy and hence control the tilt of the reactive mesogen molecules at that surface, in particular it teaches reducing the tilt angle at the RM/air interface.

EP 0,880,052 describes the fabrication of multi-domain liquid crystal devices by using a patterned, thin, twisted reactive mesogen layer above a conventional alignment layer. Although FIG. 5 of the British Application (9710481.4) shows parallel alignment in the none reactive mesogen region and twisted alignment above the reactive mesogen region, the regions above the reactive mesogen are not used for nucleating an operating state from a zero voltage non-operating state. This is additionally supported by the regions above the RM being of the same area as regions not above the RM, and that the application explicitly teaches to make the RM layer as thin as possible.

EP 0,018,180 and Journal of Applied Physics Vol. 52, No. 4, p. 3032 (1981) disclose the basic operating principle of the bistable twisted nematic (BTN) device i.e. switching between two metastable states of twist angle ±180°, a state of angle ° being the globally stable state not being used. These also disclose the use of isolation by the reduction of cell thickness in the unaddressed regions. A BTN device is a slower device than a pi-cell, but is stable in the two states of 100 ±180°, hence the name bistable. A typical BTN device is referred to as having antiparallel alignment because the rubbing directions at the two liquid crystal surfaces are anti-parallel. This actually results in the directors at the two surfaces of the liquid crystal being aligned parallel to each other.

British Patent Application No. 9911730.1 describes the fabrication of BTN devices with an isolation region between neighbouring pixels, the isolation region is a HAN state, a uniform lying helix or a focal conic texture. It is formed through patterning the surface pretilt of the alignment layer, such that the pretilt of interpixel gaps is different from that of the intrapixel region.

The antiparallel BTN has three possible stable twist states e.g. 0°, 180° and 360°, more generally: (phi−pi), phi and (phi+pi) twist states. With suitable addressing, two of these states can be accessed and used as operating states. The energy of the three stable twist states depends on the thickness-to-pitch (d/p) ration and differs, such that the lowest energy state, which is normally topologically distinct to the other two stable twist states, does not correspond to an operating state, e.g. phi. This results in the energetically favourable (but undesirable) state nucleating and growing over a period of time once the voltage is turned off. Even if this undesired state does not nucleate when the voltage is turned off, bistability is not possible without isolation because the more energetically favourable of the operating states will slowly grow into the other one.

SUMMARY OF THE INVENTION

According to the invention there is provided a liquid crystal device, and method of production thereof, as set out in the accompanying claims.

The invention makes use of surface protrusions made from anisotropic materials (in particular from polymerisable reactive mesogens) to nucleate and/or isolate an operating state of a liquid crystal device from a non-operating state.

The invention is particularly (though not exclusively) applicable to nematic devices in which the operating state is topologically distinct from the stable state at zero field applied. One such device is the pi-cell in which the operating V-state must be nucleated from the low voltage H-state. Another such device is the BTN device which when used as a storage device requires isolation of the operating states from the global minimum state and from each other.

Techniques for the nucleation of the operating V-state from the ground H-state are given in prior art documents EP 0,996,028; EP 0,965,876; JP-A-990432; and JP-A-9218411 mentioned above. EP 0,996,028 and EP 0,965,876 particularly teach modifying surface pretilt to obtain low voltage nucleation. However patterning just at an alignment layer can produce occasional failure (and hence reduced yield) due to disclination trapping at the surface. Methods described in JP-A-990432 and JP-A-9218411 do not have these problems, but for each to work effectively the device is ideally cooled from the isotropic phase under an applied field (to provide the correct anisotropic structure around the spacer ball or pillar); this proves to be a difficult industrial process. The alternative that is disclosed in EP 0,996,028 of in situ polymerisation under an applied field has the same industrial difficulty. This invention offers a solution by providing a preformed anisotropic protrusion.

Those skilled in the art will appreciate the additional application of this technique to isolation in the BTN device.

BRIEF DESCRIPTION OF THE DRAWINGS

Embodiments of the invention will now be described, by way of example only, with reference to the accompanying drawings, in which:

FIGS. 3*a* to 3*d* are schematics of the fabrication technique of embodiments to the invention;

FIGS. 4*a* to 4*c* illustrate an explanation of an embodiment of the invention;

DESCRIPTION OF THE PREFERRED EMBODIMENTS

Figure 1:
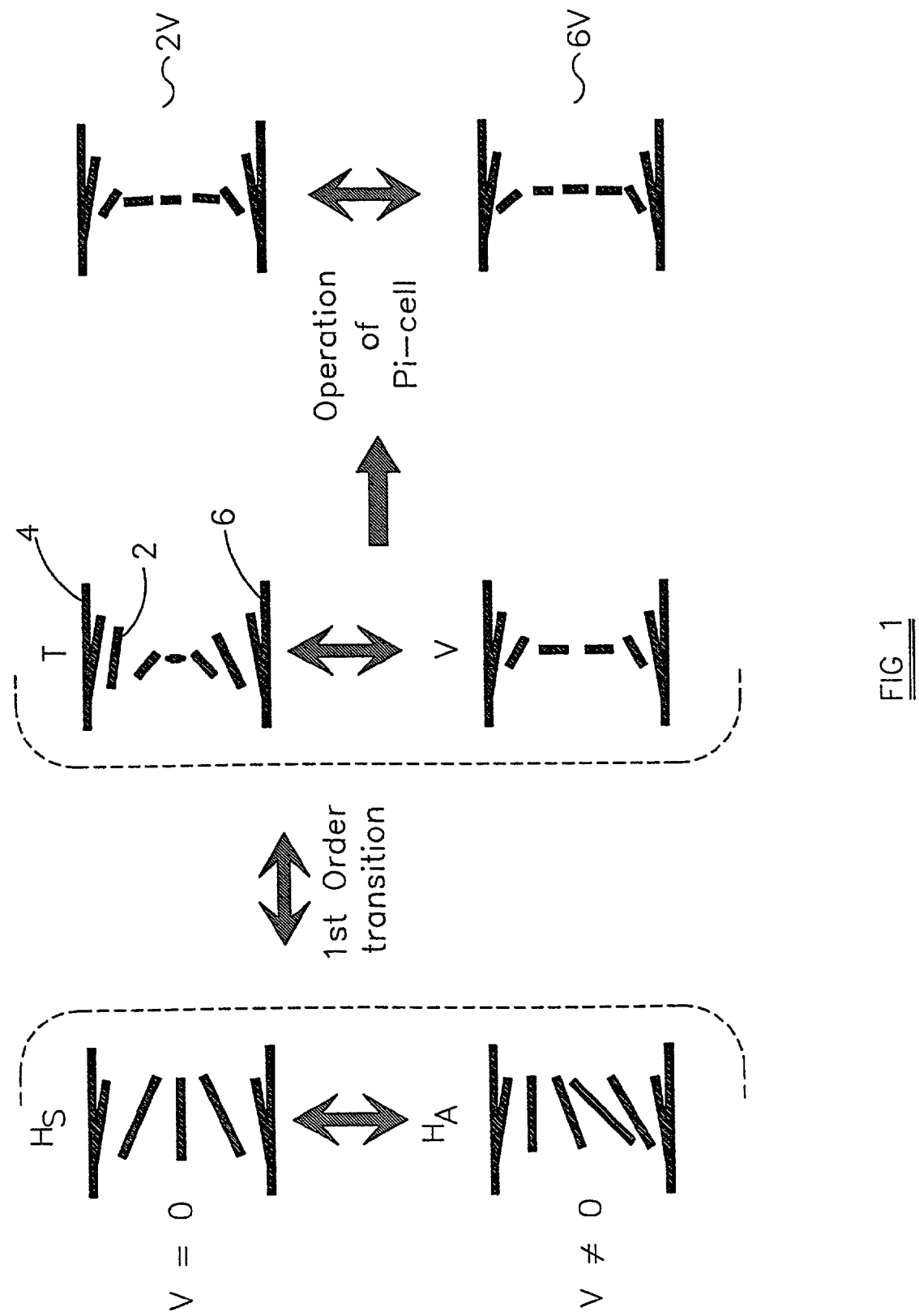
FIG. 1 is a schematic showing the operation of a pi-cell.

FIG. 1 is a schematic showing the orientation of directors 2 between substrates 4 and 6 in different states in the operation of a pi-cell, as described in the prior art documents mentioned above.

Figure 2:
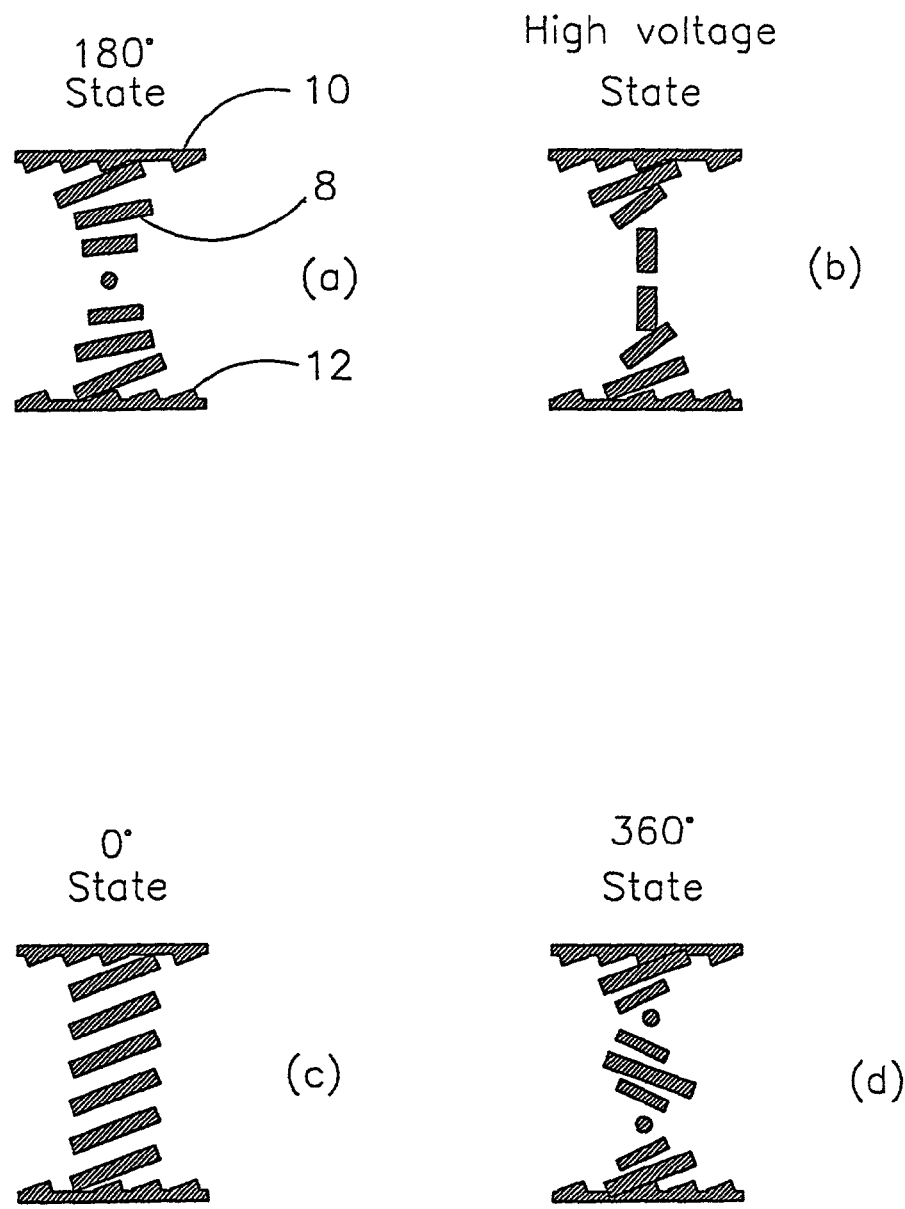
FIG. 2 is a schematic showing the operation of a BTN device.

FIG. 2 is a schematic showing the orientation of directors 8 between substrates 10 and 12 in different states in the operation of a BTN device, as described in the prior art mentioned above.

A first embodiment of the invention uses twisted anisotropic protrusions to nucleate V-state from H-state.

Referring to FIG. 3*a*, two indium tin oxide glass coated substrates 30 and 42 were coated, as known to those skilled in the art, with alignment layers 32 and 33 formed from SE610 (Nissan chemicals). Each substrate 30, 42 was then unidirectionally rubbed again as known to those skilled in the art. Referring to FIG. 3*b*, on one of these substrates 30 a mixture of 1:3 reactive mesogen RM257 (Merck) to toluene was spun at 1200 rpm (at 80° C.), the RM257 being previously doped with 1.2% CB15 (Merck) to form a protrusion layer 34. Again at 80° C. the RM257/CB15 protrusion layer 34 was UV cured through a mask 36 by UV radiation 38, and then rinsed in toluene to leave one substrate 30 coated with about 2.5 micron high twisted anisotropic protrusions 40, as shown in FIG. 3*c*. This substrate 30 was then fabricated into a 5 micron thick pi-cell using the other substrate 42, as shown in FIG. 3*d*. On application of 1.8 volts and greater the V-state was seen to grow out from the areas of anisotropic protrusion to cover the remainder of the display.

We found for this cell thickness and protrusion height that nucleation was successful when between about 1% and 3% of CB15 was mixed with the RM257.

Figure 4B:
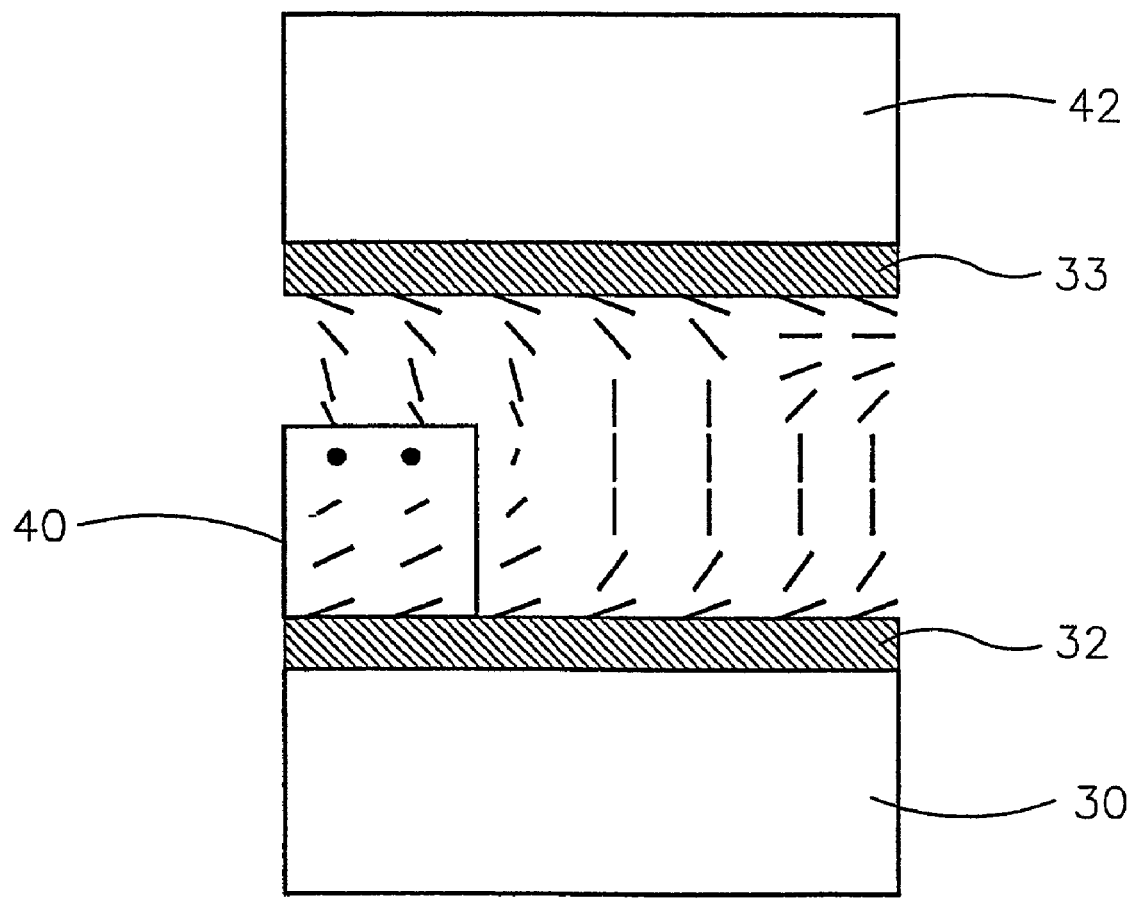
Figure 4C:
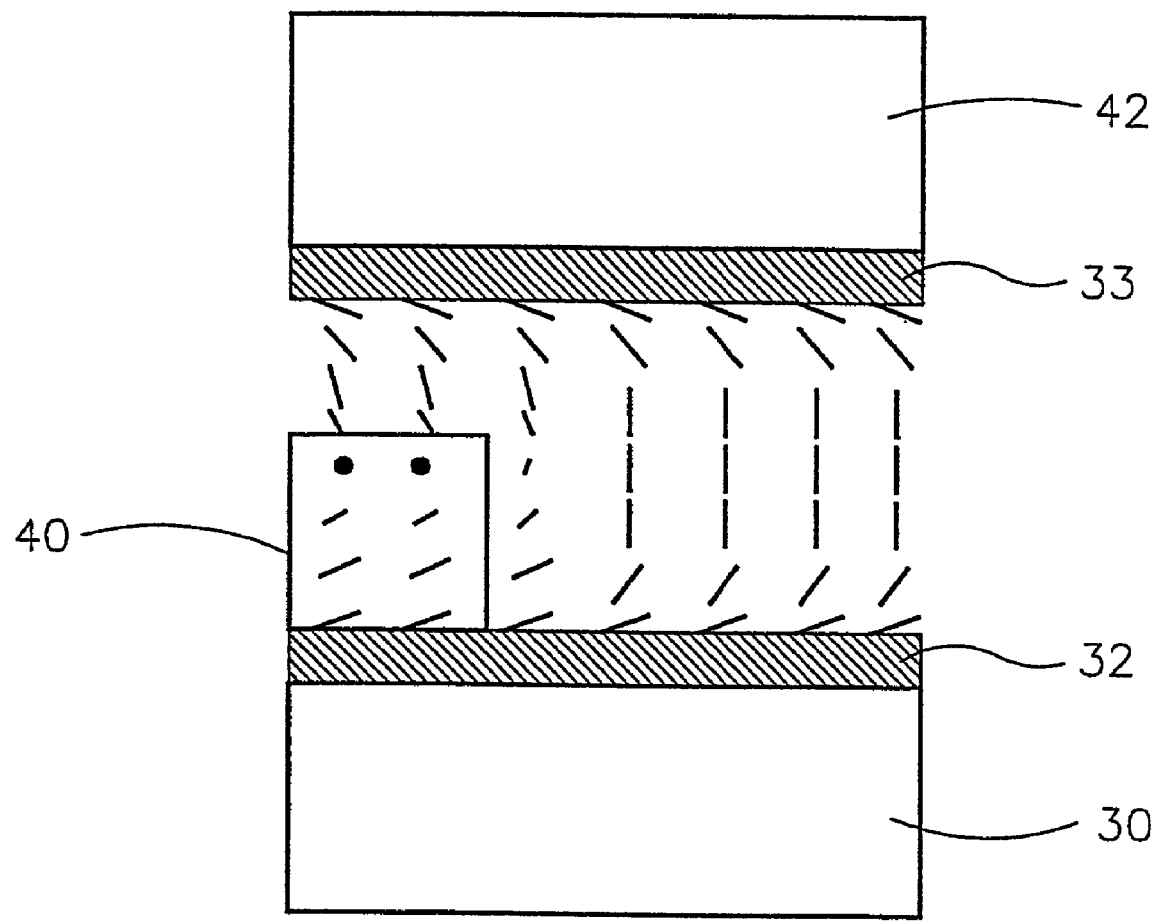

FIGS. 4*a* to 4*c* offer a possible explanation of how nucleation of the V-state proceeds, for understanding only. FIG. 4*a* shows the assumed cell cross-section at zero volts. The majority of the cell is in the H-state. However near the anisotropic protrusion 40 the liquid crystal is held in the twisted state, the state within the protrusion 40 being fixed. At about 1.8 V or greater the twist state near to the anisotropic protrusion 40 develops into the V-state as shown in FIG. 4b, and then grows to cover the rest of the cell area as shown in FIG. 4c.

A second embodiment of the invention uses tilted anisotropic protrusions to nucleate V-state from H-state Referring again to FIGS. 3a to 3d, and using the same reference numerals for simplicity, two indium tin oxide glass coated substrates 30 and 42 were coated, as known to those skilled in the art, with alignment layers 32 and 33 formed from SE610 (Nissan chemicals). Each substrate 30, 42 was then unidirectionally rubbed again as known to those skilled in the art (FIG. 3a). On one of these substrates 30 a mixture of 4:1:15 diacrylate RM257 (Merck) to monoacrylate RM308 (Merck) to toluene was spun at 1200 rpm (at 80° C.) to form a protrusion layer 34. Again at 80° C. the RM257/RM308 protrusion layer 34 was UV cured through a mask (FIG. 3b) and then rinsed in toluene to leave one substrate 30 coated with about 2.5 micron high tilted anisotropic protrusions 40 (FIG. 3c). This substrate 30 was then fabricated into a 5-micron thick pi-cell using the other substrate 42 as shown in FIG. 3d. On application of 1.8 volts and greater the V-state was seen to grow out from the areas of anisotropic protrusion to cover the remainder of the display.

In the above two embodiments the protrusion height is substantially 50% of the cell gap, being the thickness of the liquid crystal. Those skilled in the art will appreciate that the protrusions may have a height of less than or greater than this, but that the protrusion height should be typically greater than 10% of the cell gap.

Figure 5A:
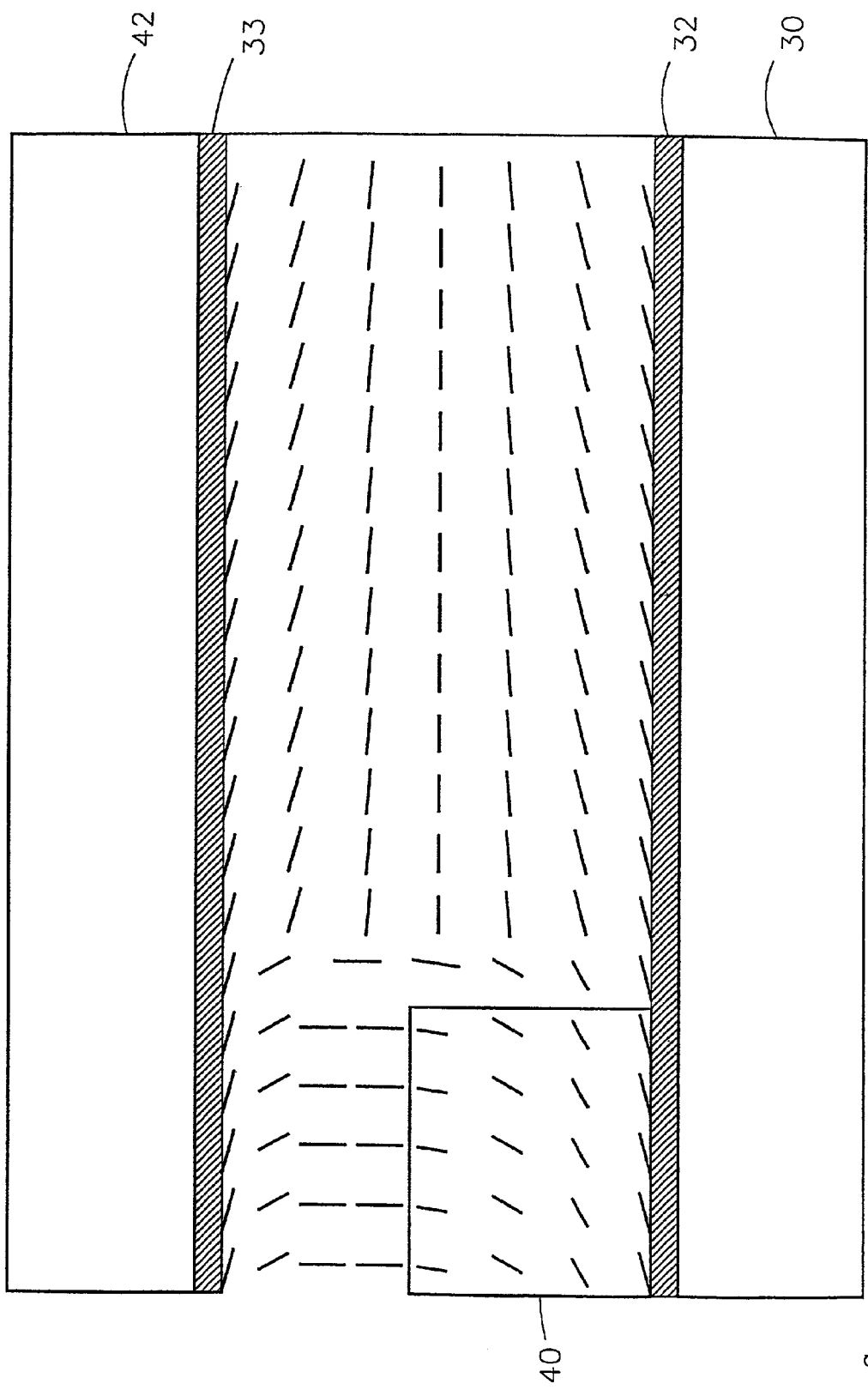
FIGS. 5*a* to 5*c* illustrate an explanation of another embodiment of the invention.
Figure 5B:
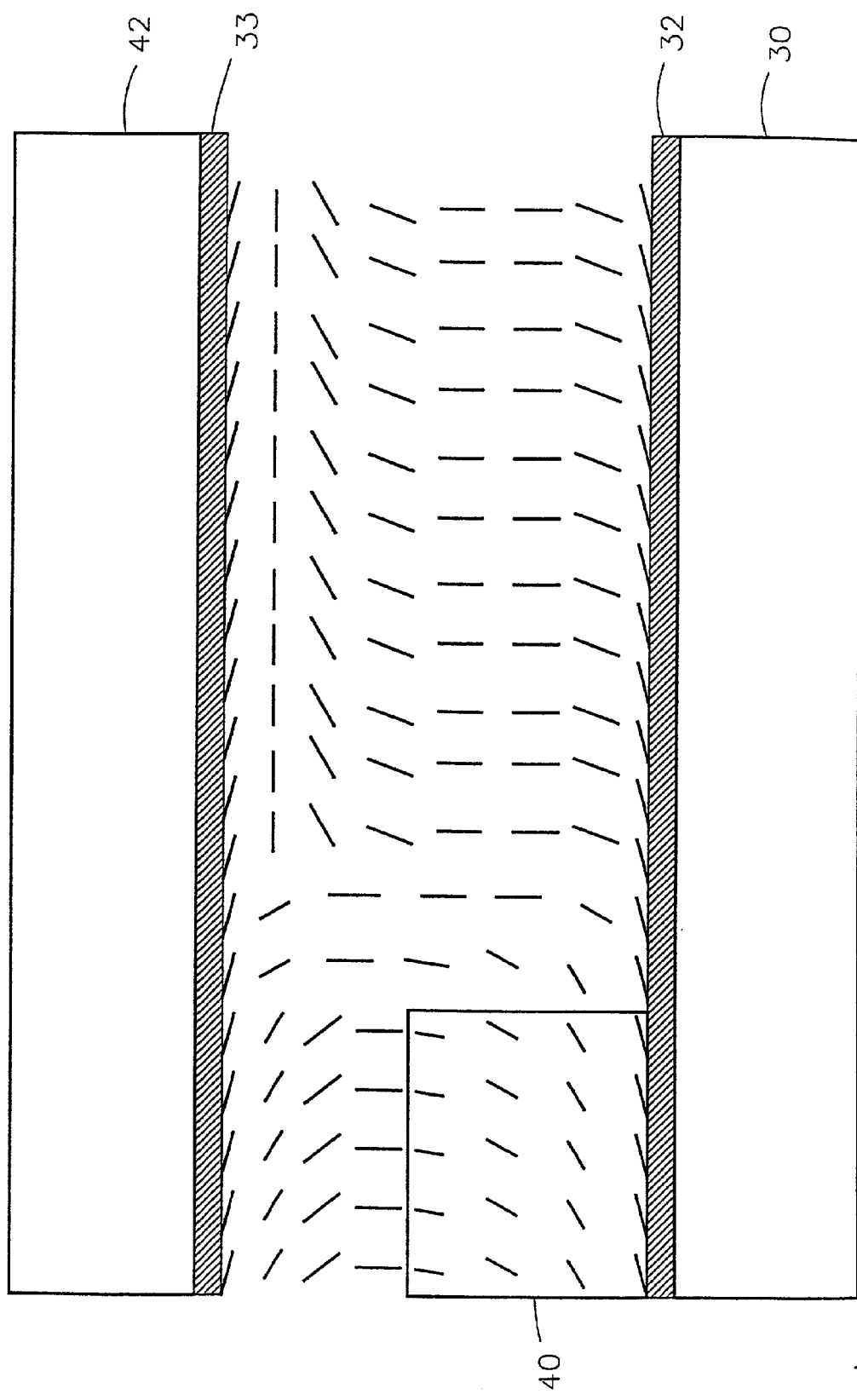
Figure 5C:
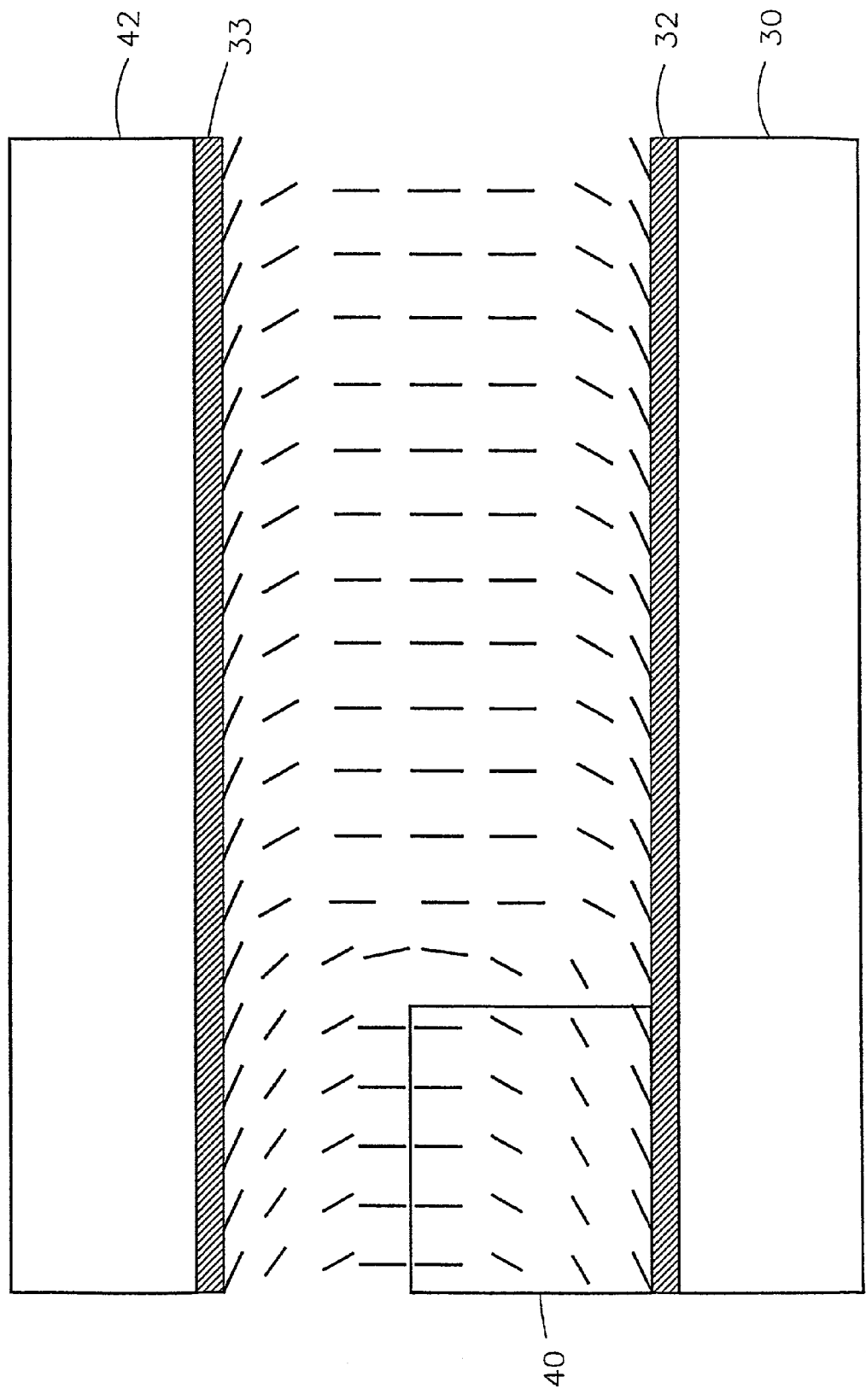

FIGS. 5a to 5c offer a potential explanation at how nucleation of the V-state proceeds, for understanding only. FIG. 5a shows the assumed cell-cross section at zero volts. The majority of the cell is in the H-state. However near the anisotropic protrusion 40 the liquid crystal is held in the V or T state. At about 1.8 V and greater the V state near to the anisotropic protrusion 40 begins to grow (FIG. 5b) and then grows to cover the rest of the cell area (FIG. 5c). In practice the fabricated anisotropic protrusions 40 do not have a rectangular cross-section but a more trapezoidal, triangular or mitre-shaped cross-section depending upon exact processing conditions.

Those skilled in the art will appreciate that an anisotropic protrusion fabricated with a high tilt at the alignment interface and a low tilt at the reactive mesogen/air interface (i.e. the eventual reactive mesogen/LC interface) could be used to nucleate the H-state from the V-state. This could be accomplished using the teaching of U.S. Pat. No. 5,995,184 mentioned above.

A third embodiment of the invention uses twisted and tilted anisotropic protrusions to nucleate V-state from H-state. This is the same as the second embodiment with the addition of a small percentage of chiral dopant Into the di-functional/mono-functional RM mixture.

A fourth embodiment of the invention uses tilted anisotropic protrusions for isolation of states in a BTN Device. We have found that tilted anisotropic protrusions also act as isolation regions in BTN devices. In this case each pixel of a display panel is fully surrounded by such a protrusion.

A fifth embodiment of the invention uses twisted anisotropic protrusions for isolation of states in a BTN Device. We have found that twisted anisotropic protrusions also act as isolation regions in BTN devices. In this case each pixel of a display panel is fully surrounded by such a protrusion.

A sixth embodiment of the invention uses tilted and twisted anisotropic protrusions for isolation of states in a BTN Device. We have found that tilted and twisted anisotropic protrusions also act as isolation regions in BTN devices. In this case each pixel of a display panel is fully surrounded by such a protrusion.

The positioning of the protrusions depends on whether the protrusions are intended to nucleate, to isolate or both, as described below.

For nucleation, the protrusion need not surround a pixel. However it is preferably present in each pixel to guarantee nucleation within each pixel. Also, each protrusion should partially overlap with the active region of the pixel, or be located adjacent or close to the active region, in order for the applied field to be able to grow the desired state into the active region. For nucleation, the protrusion must be close enough to the active region to experience sufficient influence from any applied field. If aperture ratio and contrast ratios are not paramount the protrusions could be located totally within the active region.

For isolation, the protrusion needs to surround each pixel in order to prevent the undesired state growing into it. However, the protrusion need not be within the active region (it could be located in the inter-pixel gap) as isolation does not require a field and hence maximise the aperture ratio and contrast.

For nucleation and isolation, the protrusion should both surround each pixel (for isolation) and overlap partially with, or lie adjacent or close to the active area to allow the field to grow the desired state.

A black mask may be used to mask off the protrusion.

Both isolation and nucleation can be applied to the pi-cell, SBD, BTN, reverse twist TN and other such devices.

It will be appreciated that, in any embodiment, not every protrusion is required to have the same characteristics, or to be involved in nucleation or isolation.

What is claimed is:

1. A liquid crystal device comprising a nematic liquid crystal, voltage means for applying a voltage across said liquid crystal, and two substrates each provided with an alignment layer, wherein:

said liquid crystal is sandwiched between said two substrates;

said nematic liquid crystal can be placed in at least one operating state and at least one non-operating state, at least one of said alignment layers is provided with a plurality of surface protrusions formed from an anisotropic material, and said protrusions have a height which is at least 10% of the thickness of the liquid crystal and affect alignment both near the surface and within the bulk of the liquid crystal, wherein said liquid crystal is divided into a plurality of pixels each having an active region, and the active region of each said pixel partially overlaps with at least one of said protrusions, so that nucleation occurs within said active region.

2. A liquid crystal device as claimed in claim 1, wherein said protrusions have a height which is at least 20% of the thickness of the liquid crystal.

3. A liquid crystal device as claimed in claim 2, wherein said protrusions have a height which is substantially 50% of the thickness of the liquid crystal.

4. A liquid crystal device as claimed in claim 1, wherein at least some of said protrusions nucleate said liquid crystal into said operating state from said non-operating state when said voltage exceeds a threshold value.

5. A liquid crystal device as claimed in claim 1, wherein at least some of said protrusions isolate said operating state from said non-operating state or from another operating state.

6. A liquid crystal device as claimed in claim 1, wherein said liquid crystal is divided into a plurality of pixels, and wherein each said pixel is surrounded by at least one of said protrusions, so that the pixel is isolated.

7. A liquid crystal device as claimed in claim 1, wherein said nematic liquid crystal is a pi-cell.

8. A liquid crystal device as claimed in claim 1, wherein said nematic liquid crystal is a negative pi-cell or splay bend device (SBD).

9. A liquid crystal device as claimed in claim 1, wherein said nematic liquid crystal is a bistable twisted nematic (BTN).

10. A liquid crystal device as claimed in claim 1, wherein at least some of said protrusions are twisted an isotropic protrusions.

11. A liquid crystal device as claimed in claim 1, wherein at least some of said protrusions are tilted anisotropic protrusions.

12. A liquid crystal device as claimed in claim 1, wherein at least some of said protrusions are tilted and twisted anisotropic protrusions.

13. A liquid crystal device as claimed in claim 1, wherein said anisotropic protrusions are formed from a polymerisable reactive mesogen.

14. A liquid crystal device as claimed in claim 1, wherein said operating and non-operating states are topologically distinct from each other.

15. A liquid crystal device as claimed in claim 1, wherein when said voltage is substantially zero different regions of said liquid crystal exist in first and second non-operating states, and the first non-operating state is stabilised by said anisotropic protrusions.

16. A liquid crystal device as claimed in claim 15, wherein said first and second non-operating states are T and H states respectively.

17. A liquid crystal device as claimed in claim 15, wherein said first non-operating state is the same state as said operating state.

18. A method of producing a liquid crystal device as claimed in claim 1, said method comprising the steps of forming a reactive mesogen layer on one of said substrates, curing said layer by irradiating said layer through a mask to leave said one of said substrates coated with anisotropic protrusions, and forming a liquid crystal cell by sandwiching nematic liquid crystal material between said two substrates wherein said protrusions have a height which is at least 10% of the thickness of the liquid crystal.

19. A liquid crystal device as claimed in claim 1, wherein at least some of said protrusions are trapezoidal anisotropic protrusions.

20. A liquid crystal device as claimed in claim 1, wherein at least some of said protrusions are triangular anisotropic protrusions.

21. A liquid crystal device as claimed in claim 1, wherein at least some of said protrusions are mitre-shaped anisotropic protrusions.

22. A liquid crystal device as claimed in claim 1, wherein at least a portion of the at least one of said alignment layers is rubbed.

* * * * *